United States Patent
Doerr et al.

(10) Patent No.: US 9,290,198 B2
(45) Date of Patent: Mar. 22, 2016

(54) FULLY ENGAGED JOINT ASSEMBLY

(75) Inventors: George E. Doerr, Clarkston, MI (US); Christopher J. Mielke, Shelby Township, MI (US); Miroslaw Zaloga, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 430 days.

(21) Appl. No.: 13/526,889

(22) Filed: Jun. 19, 2012

(65) Prior Publication Data
US 2013/0336712 A1 Dec. 19, 2013

(51) Int. Cl.
*F16D 3/26* (2006.01)
*B62D 1/20* (2006.01)
*F16D 3/38* (2006.01)
*F16D 3/20* (2006.01)

(52) U.S. Cl.
CPC .. *B62D 1/20* (2013.01); *F16D 3/20* (2013.01); *F16D 3/26* (2013.01); *F16D 3/387* (2013.01); *Y10T 403/1624* (2015.01); *Y10T 403/535* (2015.01); *Y10T 403/54* (2015.01); *Y10T 403/7188* (2015.01)

(58) Field of Classification Search
CPC ............... B62D 1/16; B62D 1/20; F16C 3/20; F16C 11/12; F16D 1/076; F16D 1/08; F16D 1/0805; F16D 1/0864; F16D 3/387; F16D 3/26
USPC ......... 403/1, 11–14, 289–291, 398, 399, 315, 403/316, 319, 355; 464/135, 182; 280/775, 280/777, 779, 780; 74/492
See application file for complete search history.

(56) References Cited

U.S. PATENT DOCUMENTS

| | | | | |
|---|---|---|---|---|
| 4,900,178 A * | 2/1990 | Haldric et al. | ................ | 403/290 |
| 5,358,350 A * | 10/1994 | Oertle | ............. | 403/290 |
| 6,155,739 A * | 12/2000 | Sekine et al. | .................... | 403/12 |
| 6,575,658 B2 * | 6/2003 | Daniel et al. | .................. | 403/316 |
| 6,942,415 B2 * | 9/2005 | Whitton et al. | ................ | 403/289 |
| 7,488,134 B2 * | 2/2009 | Kinme et al. | ................ | 403/398 |
| 2004/0091308 A1* | 5/2004 | Kinme et al. | ................ | 403/235 |
| 2006/0204326 A1 | 9/2006 | Kinme et al. | | |

FOREIGN PATENT DOCUMENTS

| | | | | |
|---|---|---|---|---|
| DE | 3839324 A1 | 5/1990 | | |
| DE | 3839325 | * 5/1990 | ............... | B62D 1/16 |
| DE | 4013810 A1 | 10/1991 | | |
| DE | 19847526 A1 | 4/2000 | | |
| GB | 2439086 A | 12/2007 | | |

* cited by examiner

*Primary Examiner* — Josh Skroupa

(57) ABSTRACT

A joint assembly having a shaft with a retention notch, a joint coupling, a spring clip and a full insertion clip. The joint coupling including a body having a bore, with the bore receiving the shaft, and the body including a secondary fastener hole extending normal to the bore. The spring clip including a fixed end secured to the main body, a flexible middle portion, and a finger at an opposed end, the finger engaging the shaft as the shaft slides into the bore and extending into the retention notch when the shaft is in a fully inserted position. The full insertion clip having a first end secure to the main body, a flexible portion and an opposed second end having a fastener alignment hole, the fastener alignment hole aligning with the secondary fastener hole when not flexed and misaligning with the secondary fastener hole when flexed.

16 Claims, 3 Drawing Sheets

FULLY ENGAGED JOINT ASSEMBLY

BACKGROUND OF INVENTION

The present invention relates generally to a joint assembly and more particularly to assuring that a joint is fully engaged during assembly.

For assembly of certain joints, it is important to make sure the components of the joint are fully engaged during the assembly process. This ensures the proper functioning of the assembly. For example, in a steering assembly, an intermediate steering column shaft may connect to a yoke to form a universal joint. The yoke, in turn, is connected to a steering gear input shaft. During assembly of the steering gear input shaft to the yoke, it is desirable to assure that the components are fully engaged during the assembly process in order to avoid an assembly line worker believing the assembly is fully engaged when, in fact, it is not.

SUMMARY OF INVENTION

An embodiment contemplates a joint assembly comprising a shaft having an outer surface with a retention notch recessed in the outer surface, a joint coupling, a spring clip and a full insertion clip. The joint coupling including a main body having an input shaft bore with an opening, with the input shaft bore receiving the shaft through the opening, and with the main body including a secondary fastener hole extending generally normal to the input shaft bore. The spring clip including a fixed end secured to the main body, a flexible middle portion made of a flexible material and extending from the fixed end, and a finger at an opposed end from the fixed end, the finger extending in front of the opening and engaging the shaft as the shaft slides into the input shaft bore and extending into the retention notch when the shaft is in a fully inserted position relative to the input shaft bore. The full insertion clip having a first end secure to the main body, an elastically flexible portion adjacent to the first end that is in contact with the middle portion of the spring clip and an opposed second end having a fastener alignment hole, the elastically flexible portion flexing away from the main body by the middle portion when the shaft is in a partially installed position, and the fastener alignment hole aligning with the secondary fastener hole when the elastically flexible portion is not flexed and misaligning with the secondary fastener hole when the elastically flexible portion is flexed away from the main body by the middle portion.

An embodiment contemplates a joint assembly for a steering assembly of a vehicle including a steering gear input shaft having a recessed retention notch, a yoke and a spring clip. The yoke includes a main body having an input shaft bore with an opening, with the input shaft bore receiving the shaft through the opening. The spring clip includes a fixed end secured to the main body, a flexible middle portion extending from the fixed end and made of an elastically flexible material, and a finger at an opposed end from the fixed end, the finger extending in front of the opening and configured to engage and flex out of the way of the shaft as the shaft slides into the input shaft bore and extend into the retention notch to retain the shaft in the input shaft bore when the shaft is in a fully inserted position relative to the input shaft bore.

An advantage of an embodiment is that visual, audible and tactile feedback is provided to an assembly line worker during assembly of the joint to ensure a fully engaged joint assembly. This provides a quick and sure check to ensure proper assembly. In addition, the spring clip that provides the feedback may also act to retain the assembled components in the fully engaged positions. This retention by the spring clip is maintained even if a secondary fastener in the joint becomes loose or is otherwise missing or ineffective. Also, premature installation of a secondary fastener may be prevented, thus assuring a fully engaged assembly prior to a fastener securing components together, which may reduce the possibility of cross threading or other improper installation of the secondary fastener.

DETAILED DESCRIPTION

Figure 1:
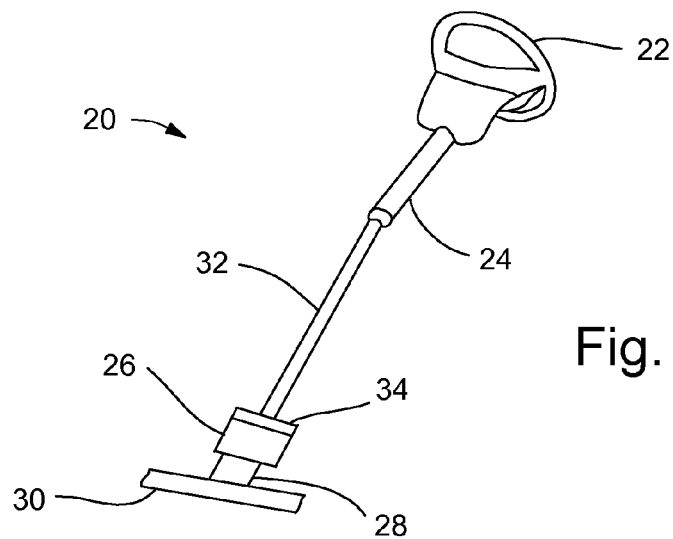
FIG. 1 is a schematic view of a portion of a steering assembly for an automotive vehicle.
Figure 2:
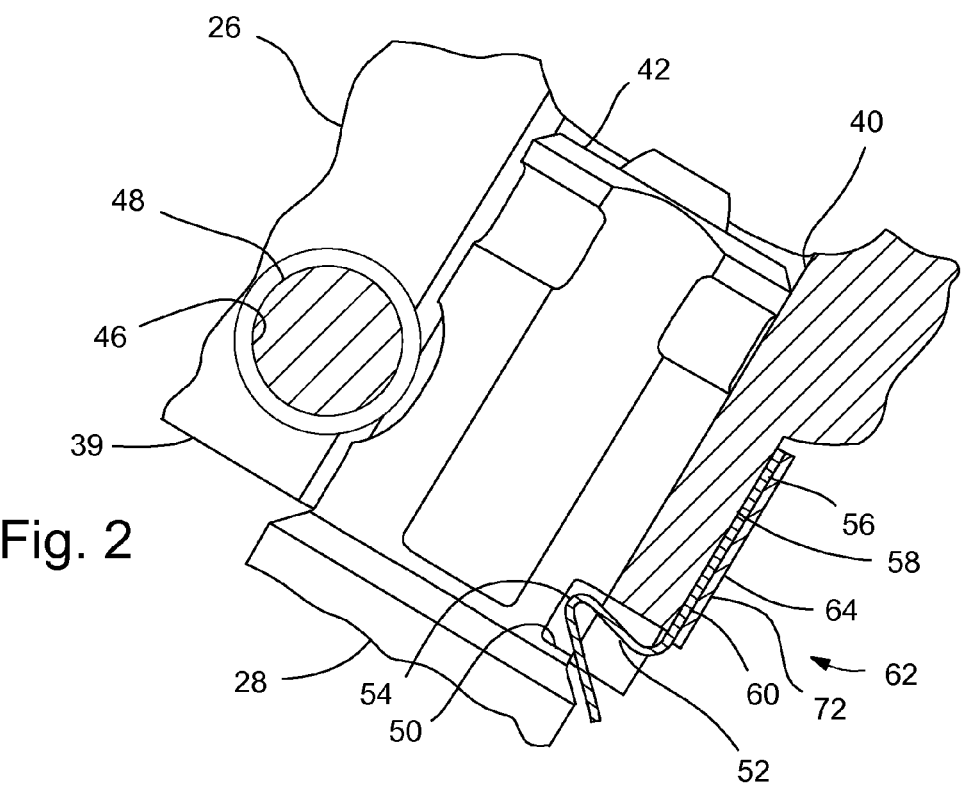
FIG. 2 is a schematic view of a portion of a joint retention assembly, in a fully engaged position, taken generally along line II-II in FIG. 4 (and rotated ninety degrees clockwise) of the yoke, spring clip and full insertion clip in section, with the steering gear input shaft shown in the input shaft bore, but not in cross section.
Figure 3:
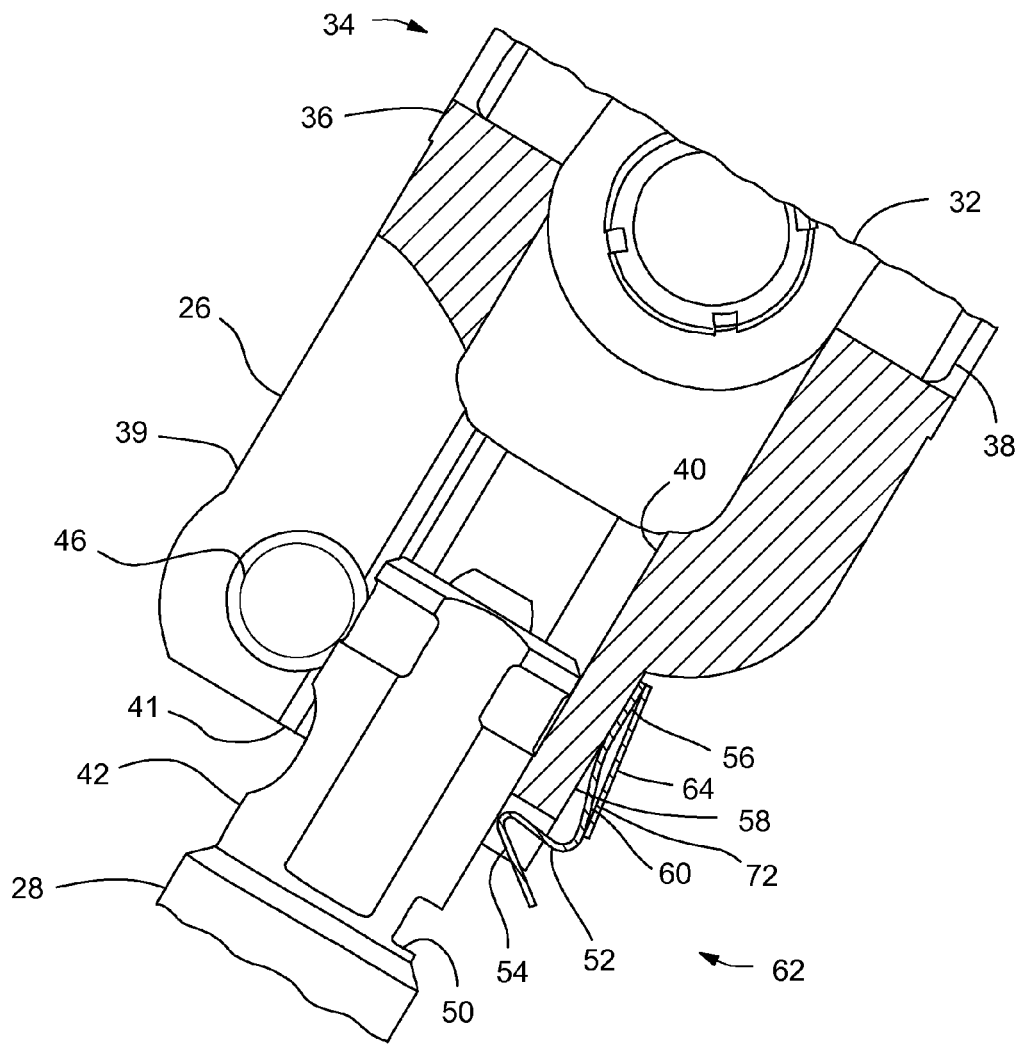
FIG. 3 is a view similar to FIG. 2, but with the steering gear input shaft shown in a partially installed position.
Figure 4:
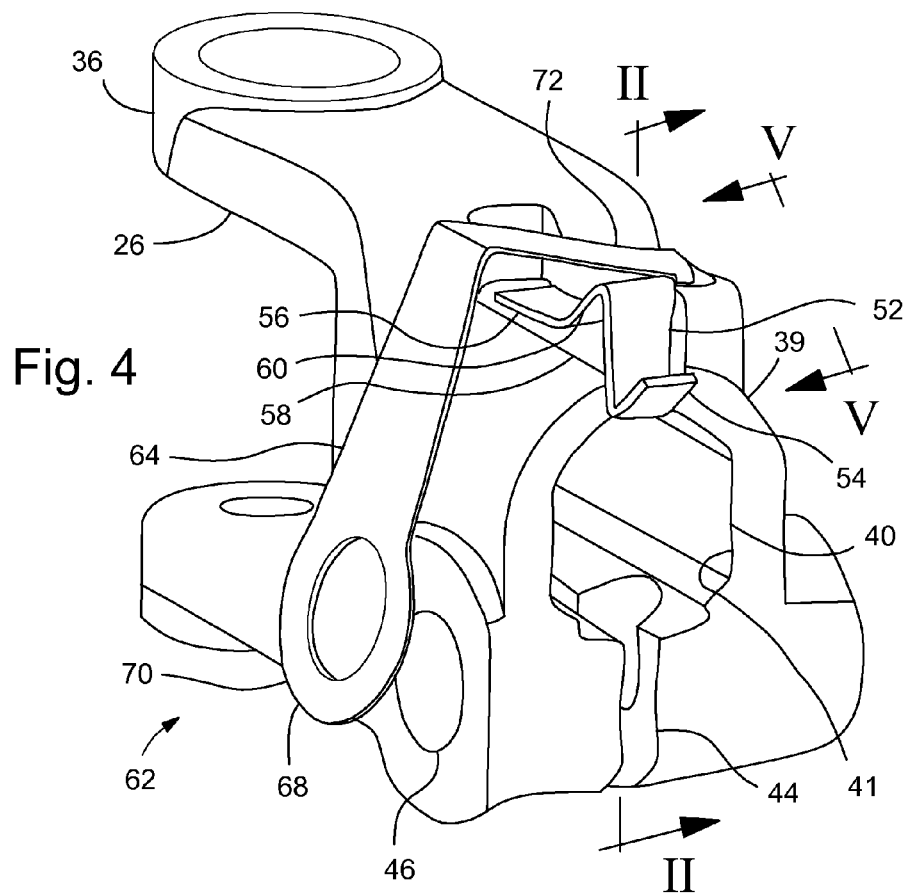
FIG. 4 is a schematic, perspective view of the yoke, spring clip and full insertion clip, with the spring clip and full insertion clip shown in the position they maintain while the steering gear input shaft (not shown in this view) is in the partially installed position.
Figure 5:
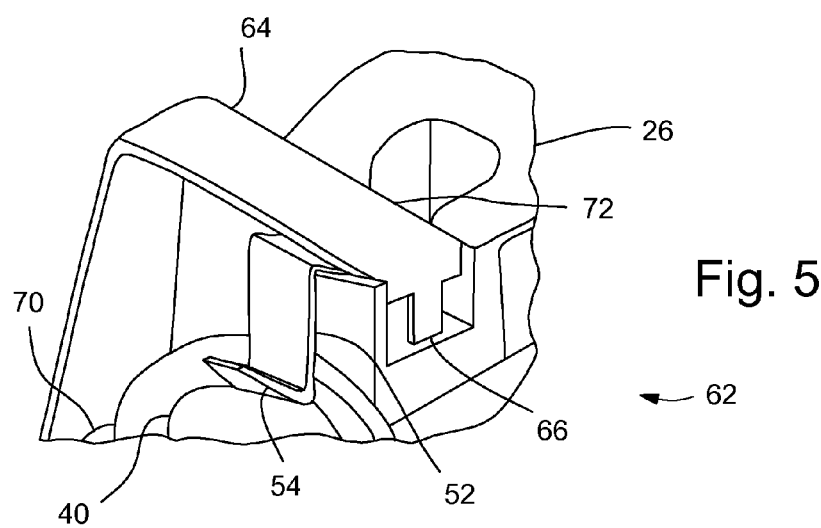
FIG. 5 is a schematic, perspective view of a portion of the assembly of FIG. 4, shown in the direction of arrows V-V in FIG. 4.

Referring to FIGS. 1-5, a portion of a vehicle steering assembly 20 is shown. The steering assembly 20 may include a steering wheel 22, a steering column 24, a yoke (joint coupling) 26, a steering gear input shaft 28 and a steering gear assembly 30. The steering column 24 may include an intermediate shaft 32. The steering wheel 22, steering column 24 and steering gear assembly 30 may be conventional and so will not be discussed further herein. The intermediate shaft 32 may connect with the yoke 26 to form a universal joint 34, which allows for pivoting of the intermediate shaft 32 relative to the yoke 26. This universal joint 34 may also be conventional and so will not be discussed further herein.

The yoke 26 has lugs 36 at a first end that are used with pins 38 of the universal joint 34. A main body 39 on an opposite end of the yoke 26 includes an input shaft bore 40. The input shaft bore 40 is shaped to telescopically receive a corresponding engagement portion 42 of the steering gear input shaft 28 through an opening 41. The input shaft bore 40 and engagement portion 42 may have corresponding non-circular shapes so that they only fit together in one orientation and cannot rotate relative to each other after assembly. The yoke 26 may also include a pinch slot 44, which is narrower than and extends from the input shaft bore 40 to an exterior surface of the yoke 26, and a secondary fastener hole 46 that extends generally normal to the pinch slot 44. A secondary fastener 48 (only shown in cross section in FIG. 2) may extend through the fastener hole 46 and be employed to pull the pinch slot 44 together to close the input shaft bore 40 around the engagement portion 42. The secondary fastener 48 may operate as a pinch bolt (sliding through one side of the secondary fastener hole 46 and threading into the other to allow for squeezing the pinch slot 44 closed) or may operate as a through bolt (sliding through both sides of the secondary fastener hole 46 and being secured with a nut (not shown) or other means to the opposite side of the yoke 26). The pinch slot 44 is narrower than the engage portion 42, which is sized and shaped to telescopically slide into the input shaft bore 40 prior to pulling the pinch slot together with the fastener 48.

The engagement portion 42 of the steering gear input shaft 28 includes a retention notch 50 that is located to secure the steering gear input shaft 28 in the fully engaged position relative to the yoke 26 by a spring clip 52. The steering gear input shaft 28 may be otherwise conventional and so the other features of this shaft will not be discussed further herein. The retention notch 50 and the spring clip 52 are part of a joint retention assembly 62.

The spring clip 52 has a V-shaped finger 54 at a first end, a second end 56 permanently mounted to a spring surface 58 of the yoke 26, and a flexible middle portion 60 that extends in a direction generally parallel to the telescopic direction the shaft is inserted into the bore and biases the finger 54 toward the input shaft bore 40. Thus, in the spring clip's generally un-flexed position (shown in FIG. 2), the middle portion 60 lies flat against the spring surface 58 and the finger 54 extends into the input shaft bore 40. When the spring clip 52 is flexed, the middle portion 60 bends outward away from the spring surface 58 and the finger 54 does not extend into the input shaft bore 40 (shown in FIGS. 3-5). The spring clip 52 may be made of any flexible material that allows it to flex elastically and then return to its original shape.

The joint retention assembly 62 may also include a full insertion clip 64. The full insertion clip 64 is optional but does provide additional protection against improper assembly of the steering assembly 20. The full insertion clip 64 has a first end 66 that is secured to the yoke 26, a second end 68 that includes a fastener alignment hole 70, and an intermediate spring engagement portion 72 that extends in a direction generally normal to the middle portion 60 of the spring clip 52 and rests on the middle portion 60 of the spring clip 52. The full insertion clip 64 may be made of any flexible material that allows it to flex elastically and then return to its original shape. The full insertion clip 64, in its generally un-flexed position, rests on the spring clip 52 (also in an un-flexed position), which allows the fastener alignment hole 70 to align with the secondary fastener hole 46 in the yoke 26. However, when the spring clip 52 is flexed upward, the spring clip 52 pushes against the spring engagement portion 72 of the full insertion clip 64, causing the clip 64 to flex outward from the yoke 26. This outward flexing causes the fastener alignment hole 70 to be misaligned with the secondary fastener hole 46, interfering with insertion of the secondary fastener 48 into the secondary fastener hole 46.

The assembly process for the joint retention assembly 62 will now be discussed. As an assembly line worker (assembler) is assembling the steering assembly 20, at one point in the assembly process the steering gear input shaft 28 needs to be assembled to the yoke 26. At this point, the assembler orients the engagement portion 42 of the input shaft 28 for sliding into the input shaft bore 40 of the yoke 26. As the assembler begins to slide the engagement portion 42 into the input shaft bore 40, the engagement portion 42 will push the V-shaped finger 54 of the spring clip 52 out of the bore 40 against the bias of the middle portion 60 of the spring clip 52 and against the bias of the full insertion clip 64 (if the particular joint retention assembly 62 includes the clip 64).

At this point in the assembly process, the assembler is provided with feedback that the interfacing components of the joint assembly are not fully engaged. The spring clip 52 extends away from the spring surface 58 of the yoke 26, providing both visual and tactile feedback to the assembler. In addition, the second end 68 of the full insertion clip 64 is flexed out away from the yoke 26, so the fastener alignment hole 70 is not aligned with the secondary fastener 48. This provides additional feedback for the assembler to easily and quickly determine that the joint assembly is not fully engaged.

As the assembler slides the engagement portion 42 into the fully engaged position in the input shaft bore 40, the retention notch 50 in the engagement portion 42 will align with the finger 54 of the spring clip 52. At this point, the flexed middle portion 60 of the spring clip 52 will cause the finger 54 to snap into the retention notch 50, which, in turn, allows the second end 68 of the full insertion clip 64 to move toward the yoke 26 and align the fastener alignment hole 70 with the secondary fastener hole 46. As a consequence, the assembler has an audible indication—the snapping into the retention notch 50—of full engagement, as well as visual and tactile indications of full engagement of the joint assembly. With the finger 54 in the retention notch 50, the engagement portion 42 is retained in the input shaft bore 40. Moreover, the secondary fastener 48 can now be installed since the fastener alignment hole 70 aligns with the secondary fastener hole 46. The assembler may tighten the secondary fastener 48 in the secondary fastener hole 46, pulling the pinch slot 44 partially closed, which reduces the possibility of lash in the assembly.

While certain embodiments of the present invention have been described in detail, those familiar with the art to which this invention relates will recognize various alternative designs and embodiments for practicing the invention as defined by the following claims.

What is claimed is:

1. A joint assembly comprising:
   a shaft having an outer surface with a retention notch recessed in the outer surface;
   a joint coupling including a main body having an input shaft bore with an opening, the input shaft bore configured to receive the shaft in slidable engagement through the opening, the main body including a secondary fastener hole extending generally normal to the input shaft bore;
   a spring clip including a fixed end secured to the main body, a flexible middle portion made of a flexible material and extending from the fixed end, and a finger at an opposed end from the fixed end, the finger extending in front of the opening and configured to engage the shaft as the shaft slides into the input shaft bore and extend into the retention notch when the shaft is in a fully inserted position relative to the input shaft bore; and
   a full insertion clip having a first end secured to the main body, an elastically flexible portion adjacent to the first end that is in contact with the middle portion of the spring clip and an opposed second end having a fastener alignment hole, the elastically flexible portion configured to be flexed away from the main body by the middle portion when the shaft is in a partially installed position, and the fastener alignment hole configured to align with the secondary fastener hole when the elastically flexible portion is not flexed and misalign with the secondary fastener hole when the elastically flexible portion is flexed away from the main body by the middle portion.

2. The joint assembly of claim 1 wherein the finger is V-shaped and a bottom of the V-shape is biased against the shaft when the shaft is in the partially installed position.

3. The joint assembly of claim 1 including a secondary fastener extending through the fastener alignment hole and the secondary fastener hole.

4. The joint assembly of claim 3 wherein the main body includes a pinch slot extending from the input shaft bore to an outer surface of the main body at an orientation generally normal to the secondary fastener hole, and the secondary fastener is configured to engage the main body to reduce a width of the pinch slot; and the width of the pinch slot, with the secondary fastener not engaged, being narrower than the input shaft bore and configured to prevent the shaft from sliding through the pinch slot.

5. The joint assembly of claim 1 wherein the joint assembly is for use in a steering gear assembly of a vehicle, and wherein the shaft is a steering gear input shaft and the joint coupling is a yoke of a steering column.

6. The joint assembly of claim 1 wherein the elastically flexible portion is in surface contact with the middle portion of the spring clip.

7. The joint assembly of claim 1 wherein the input shaft bore is configured to receive the shaft in telescopically slidable engagement into the opening.

8. The joint assembly of claim 7 wherein the flexible middle portion of the spring clip extends from the fixed end of the spring clip in a direction that is generally parallel to the telescopic direction that the shaft is inserted into the input shaft bore.

9. The joint assembly of claim 1 wherein the flexible middle portion of the spring clip extends from the fixed end of the spring clip in a direction that is normal to the direction that the elastically flexible portion of the full insertion clip extends from the first end of the full insertion clip.

10. A joint assembly for a steering assembly of a vehicle comprising:
a steering gear input shaft having a recessed retention notch;
a yoke including a main body having an input shaft bore with an opening, the input shaft bore configured to telescopically receive the shaft in slidable engagement into the opening; and
a spring clip including a fixed end secured to the main body, a flexible middle portion extending from the fixed end and made of an elastically flexible material, and a finger at an opposed end from the fixed end, the finger extending in front of the opening and configured to engage and flex out of the way of the shaft as the shaft telescopically slides into the input shaft bore and extend into the retention notch to retain the shaft in the input shaft bore when the shaft is in a fully inserted position relative to the input shaft bore,
wherein the flexible middle portion of the spring clip extends from the fixed end of the spring clip in a direction that is generally parallel to the telescopic direction that the shaft is inserted into the input shaft bore.

11. The joint assembly of claim 10 wherein the main body includes a secondary fastener hole extending generally normal and adjacent to the input shaft bore; the joint assembly further including a full insertion clip having a first end secured to the main body, an elastically flexible portion adjacent to the first end that is in contact with the middle portion of the spring clip and an opposed second end having a fastener alignment hole, the elastically flexible portion configured to be flexed away from the main body by the middle portion when the shaft is in a partially installed position, and the fastener alignment hole configured to align with the secondary fastener hole when the elastically flexible portion is not flexed and misalign with the secondary fastener hole when the elastically flexible portion is flexed away from the main body by the middle portion.

12. The joint assembly of claim 11 including a secondary fastener extending through the fastener alignment hole and the secondary fastener hole.

13. The joint assembly of claim 12 wherein the main body includes a pinch slot extending from the input shaft bore to an outer surface of the main body at an orientation generally normal to the secondary fastener hole, and the secondary fastener is configured to engage the main body to reduce a width of the pinch slot; and the width of the pinch slot, with the secondary fastener not engaged, being narrower than the input shaft bore and configured to prevent the shaft from sliding through the pinch slot.

14. The joint assembly of claim 11 wherein the elastically flexible portion is in surface contact with the middle portion of the spring clip.

15. The joint assembly of claim 11 wherein the flexible middle portion of the spring clip extends from the fixed end of the spring clip in a direction that is normal to the direction that the elastically flexible portion of the full insertion clip extends from the first end of the full insertion clip.

16. The joint assembly of claim 10 wherein the finger is V-shaped and a bottom of the V-shape is biased against the shaft when the shaft is in the partially installed position.

\* \* \* \* \*